(12) United States Patent
Gujjar et al.

(10) Patent No.: US 8,141,416 B2
(45) Date of Patent: Mar. 27, 2012

(54) SYSTEMS AND METHODS FOR IDENTIFYING WIND TURBINE PERFORMANCE INEFFICIENCY

(75) Inventors: Vineel Chandrakanth Gujjar, Greenville, SC (US); Colin Craig McCulloch, Charlton, NY (US); Philippe Giguere, Simpsonville, SC (US); Abhishek Kumar Srivastava, Bangalore (IN); Angshuman Saha, Bangalore (IN); Pameet Singh, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/895,521

(22) Filed: Sep. 30, 2010

(65) Prior Publication Data

US 2011/0270450 A1    Nov. 3, 2011

(51) Int. Cl.
*G01M 9/00* (2006.01)
*H02P 9/04* (2006.01)
(52) U.S. Cl. ............................. 73/147; 290/44
(58) Field of Classification Search ........... None
See application file for complete search history.

(56) References Cited

U.S. PATENT DOCUMENTS

| | | | |
|---|---|---|---|
| 7,939,954 B2 * | 5/2011 | Ruiz Flores et al. | 290/44 |
| 2007/0125165 A1 | 6/2007 | Ormel et al. | |
| 2007/0140847 A1 * | 6/2007 | Martinez De Lizarduy Romo et al. | 416/11 |
| 2009/0183576 A1 | 7/2009 | Honhoff et al. | |
| 2010/0268849 A1 * | 10/2010 | Bengtson et al. | 709/248 |

FOREIGN PATENT DOCUMENTS

EP    2015082 A2    1/2009

OTHER PUBLICATIONS

Ioannis Antoniou, Nacelle Anemometry on a 1MW Wind Turbine: Comparing the Power Performance Results by Use of the Nacelle or Mast Anemometer, Riso, National Laboratory, Roskilde, Denmark, Aug. 1997.

* cited by examiner

*Primary Examiner* — Andre Allen
(74) *Attorney, Agent, or Firm* — Ann M. Agosti (57) ABSTRACT

The present disclosure relates to an approach by which low-performing turbines may be identified from among a plurality of wind turbines, such as may be present at a wind power plant. In accordance with one embodiment, low-performing turbines are identified from among pairs of turbines and based upon a comparison of the observed and expected performance of the turbines within each pair.

20 Claims, 9 Drawing Sheets

| ID1 | ID2 | SAMPLE SIZE | OBSERVED VDIFF (T2-T1) | OBSERVED PDIFF (T2-T1) | EXPECTED PDIFF (T2-T1) | NORMALIZED SCORE Dx | OPPORTUNITY TURBINE |
|---|---|---|---|---|---|---|---|
| 83 | 84 | 4816 | 0.14 | 57.47 | 31.89 | 31.14 OPPORTUNITY | 83 |
| 67 | 68 | 4956 | -0.23 | -68.34 | -42.94 | 27.53 OPPORTUNITY | 68 |
| 85 | 86 | 3821 | 0.11 | 46.74 | 25.66 | 22.30 OPPORTUNITY | 85 |
| 103 | 104 | 1196 | 0.06 | -21.30 | 12.97 | 21.66 OPPORTUNITY | 104 |
| 94 | 95 | 4513 | 0.04 | 22.74 | 6.62 | 20.66 OPPORTUNITY | 94 |
| 95 | 96 | 2333 | 0.04 | -11.43 | 7.06 | 18.07 OPPORTUNITY | 96 |
| 112 | 126 | 2018 | -0.03 | 19.96 | -5.04 | 16.47 OPPORTUNITY | 112 |
| 121 | 122 | 2935 | -0.04 | 3.57 | -1.89 | 6.27 OK | 121 |
| 107 | 109 | 1469 | 0.01 | -6.40 | 2.04 | 5.06 OK | 109 |
| 106 | 107 | 1461 | -0.09 | -24.19 | -20.02 | 2.59 OK | 107 |
| 79 | 80 | 2705 | -0.32 | -63.94 | -62.99 | 0.62 OK | 80 |
| 101 | 102 | 1763 | -0.01 | -2.04 | -3.28 | -0.53 ANEMOMETRY | |
| 123 | 124 | 1358 | 0.36 | 75.63 | 79.48 | -1.33 ANEMOMETRY | |
| 77 | 78 | 3684 | 0.20 | 22.88 | 25.11 | -1.97 ANEMOMETRY | |
| 120 | 121 | 3111 | -0.15 | -21.26 | -25.60 | -4.43 ANEMOMETRY | |
| 119 | 123 | 2103 | 0.08 | 5.88 | 15.04 | -8.89 ANEMOMETRY | |
| 69 | 70 | 5810 | 0.14 | 24.35 | 31.74 | -9.73 ANEMOMETRY | |
| 92 | 93 | 3558 | 0.36 | 52.71 | 68.94 | -14.28 ANEMOMETRY | |
| 110 | 111 | 5290 | 0.13 | 14.73 | 31.64 | -15.16 ANEMOMETRY | |
| 89 | 90 | 5306 | -0.30 | -49.70 | -62.89 | -15.64 ANEMOMETRY | |
| 119 | 120 | 3707 | 0.15 | -10.66 | -26.38 | -18.81 ANEMOMETRY | |
| 80 | 81 | 4533 | -0.30 | -30.90 | -54.29 | -26.04 ANEMOMETRY | |
| 93 | 94 | 4632 | -0.39 | -39.88 | -73.91 | -27.87 ANEMOMETRY | |
| 78 | 79 | 2518 | 0.74 | 97.72 | 143.40 | -29.10 ANEMOMETRY | |
| 118 | 122 | 2929 | -0.28 | -18.13 | -46.75 | -33.22 ANEMOMETRY | |
| 104 | 105 | 5532 | -0.38 | -50.10 | -80.46 | -33.97 ANEMOMETRY | |
| 109 | 110 | 4381 | -0.13 | 10.07 | -28.22 | -38.42 ANEMOMETRY | |
| 76 | 77 | 3673 | -0.30 | -10.10 | -49.96 | -39.73 ANEMOMETRY | |
| 81 | 91 | 3629 | -0.39 | -32.97 | -71.93 | -42.69 ANEMOMETRY | |
| 71 | 72 | 2786 | 0.23 | -10.38 | 43.62 | -46.13 ANEMOMETRY | |
| 72 | 73 | 4039 | 0.38 | 24.85 | 76.16 | -56.28 ANEMOMETRY | |
| 91 | 92 | 3575 | 0.27 | 1.15 | 50.37 | -59.43 ANEMOMETRY | |
| 73 | 74 | 6256 | -0.40 | -28.53 | -80.58 | -65.34 ANEMOMETRY | |
| 82 | 86 | 3778 | -0.45 | -1.23 | -92.42 | -82.76 ANEMOMETRY | |
| 82 | 83 | 5011 | -0.63 | -37.73 | -126.78 | -93.15 ANEMOMETRY | |

FIG. 9

SYSTEMS AND METHODS FOR IDENTIFYING WIND TURBINE PERFORMANCE INEFFICIENCY

BACKGROUND OF THE INVENTION

The subject matter disclosed herein relates to systems and methods for evaluating wind turbine performance, such as at a wind power plant.

Wind turbines typically include multiple blades extending from a central hub. The hub is rotatably coupled to a nacelle suspended above the ground by a tower. Generally, the nacelle houses an electric generator coupled to the hub and configured to generate electrical power as the blades are driven to rotate by the wind. Wind turbine blades are typically designed and manufactured to efficiently transfer wind energy into rotational motion, thereby providing the generator with sufficient rotational energy for power generation.

Wind power plants typically consist of multiple wind turbines of this type spread over a given geographic region. Wind passing over the region causes blades associated with each wind turbine to rotate, thereby generating electrical power. In such a wind power plant, each turbine is expected to see generally similar wind and climate conditions due to being situated in the same geographic region. However, at any given moment, the precise wind and climate conditions a wind turbine is exposed to may differ from other turbines at the plant due to microclimate and/or terrain variations unique to the turbine.

Further, a given turbine may exhibit different performance characteristics from other turbines due to manufacturing variations between the turbines and/or human or programming errors in controlling or operating a turbine control system associated with the plant. Due to some or all of these myriad factors, wind turbines at a given plant may exhibit variation in their performance. The extent of performance variation among turbines, however, is generally not well understood due to the confounding of the above-described factors as well as other factors. Thus, it may be difficult to identify those turbines providing lower than expected performance at a wind plant, much less to address such low performance.

BRIEF DESCRIPTION OF THE INVENTION

In a first embodiment, a method is provided for assessing wind turbine performance. In accordance with this method, turbines of a plurality of wind turbines are paired to generate one or more pairs of turbines. A set of concurrently acquired operational data is acquired for each pair of turbines. The set of concurrently acquired operational data of each pair of turbines is filtered to generate a respective set of filtered data for each pair of turbines. A low-performing turbine within some or all of the respective pairs of turbines is identified based on the respective sets of filtered data.

In a second embodiment, a processor-based controller is provided that is configured to control operation of one or more pairs of wind turbines. The processor-based controller is configured to execute one or more routines which, when executed, perform acts comprising: computing an observed power difference for each pair of turbines; computing an expected power difference for each pair of turbines; and identifying a low-performing turbine, if present, within each pair of turbines based on a measure derived based at least on the observed power difference and the expected power difference for the respective pair of turbines.

In a third embodiment, computer-readable media comprising a computer program product is provided. The computer program product comprises routines which, when executed on a processor, perform the following: filtering a set of operational data for a pair of wind turbines to generate a filtered set of data; computing a measure of observed power difference for the pair of wind turbines; computing a measure of expected power difference for the pair of wind turbines; and comparing the measure of observed power difference and the measure of expected power difference for the pair of wind turbines.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9 depicts a summary report for an analysis of multiple pairs of wind turbines in accordance with aspects of the present disclosure.

DETAILED DESCRIPTION OF THE INVENTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements.

The terms "comprising," "including," and "having" are intended to be inclusive and mean that there may be additional elements other than the listed elements.

The present disclosure provides for the evaluation of wind turbine performance for different wind turbines at a wind power plant. In particular, data driven approaches are employed to identify and reduce performance variation among wind turbine, thereby improving overall wind plant performance. In accordance with one described approach, turbines are identified that have lower than average performance. An evaluation or analysis, such as a root cause analysis, is performed for those turbines having lower performance and based on the analysis, recommendations may be made to eliminate or reduce identified performance issues. For example, recommendations may be made to correct blade pitch, blade surface conditions, bearing conditions, hub alignment, gear box repairs, and so forth. Likewise, to the extent feasible, changes may be made to controller settings to address poor performance of a turbine.

Figure 1:
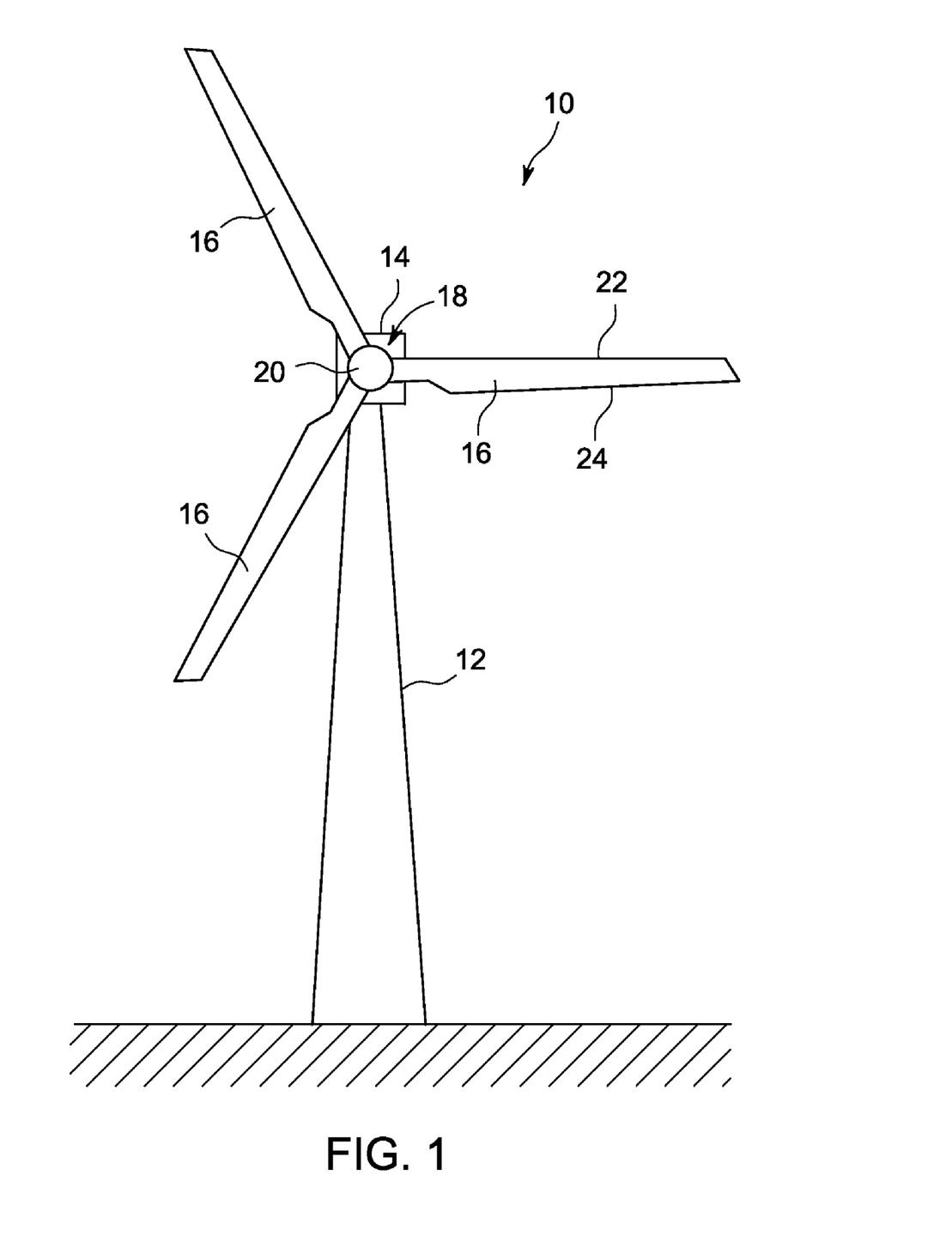
FIG. 1 is a front view of a wind turbine system for use in a wind power plant in accordance with aspects of the present disclosure.

FIG. 1 is a front view of a wind turbine system 10 configured to convert wind energy into electrical energy. The wind turbine system 10 includes a tower 12, a nacelle 14 and blades 16. The blades 16 are coupled to a generator 18 within the nacelle 14 by a hub 20 that rotates with the blades 16. The blades 16 are configured to convert the linear air flow from the wind into rotational motion. As the blades 16 rotate, the coupling between the hub 20 and the generator 18 within the nacelle 14 drives components of the generator 18 to rotate, thereby producing electrical energy. While three blades 16 are included in the wind turbine system 10 of the present embodiment, alternative embodiments may include more or fewer blades 16.

Each blade 16 includes a leading edge 22 and a trailing edge 24. The air flow engages the leading edge 22 and flows toward the trailing edge 24. Due to the shape of the blades 16, aerodynamic forces caused by the air flow induce the blades 16 to rotate, thereby driving the generator 18 to produce electrical power. Efficiency of the wind turbine system 10 is at least partially dependent upon converting linear air flow into rotational energy. Therefore, the blades 16 are generally configured to efficiently transfer wind energy into rotational motion. For example, blade shape may be selected to enhance air flow over the blade 16 such that aerodynamic forces induce the blade 16 to rotate. In addition, the blades 16 are typically manufactured to be substantially smooth, such that air flows over the blades 16 without interference.

Figure 2:
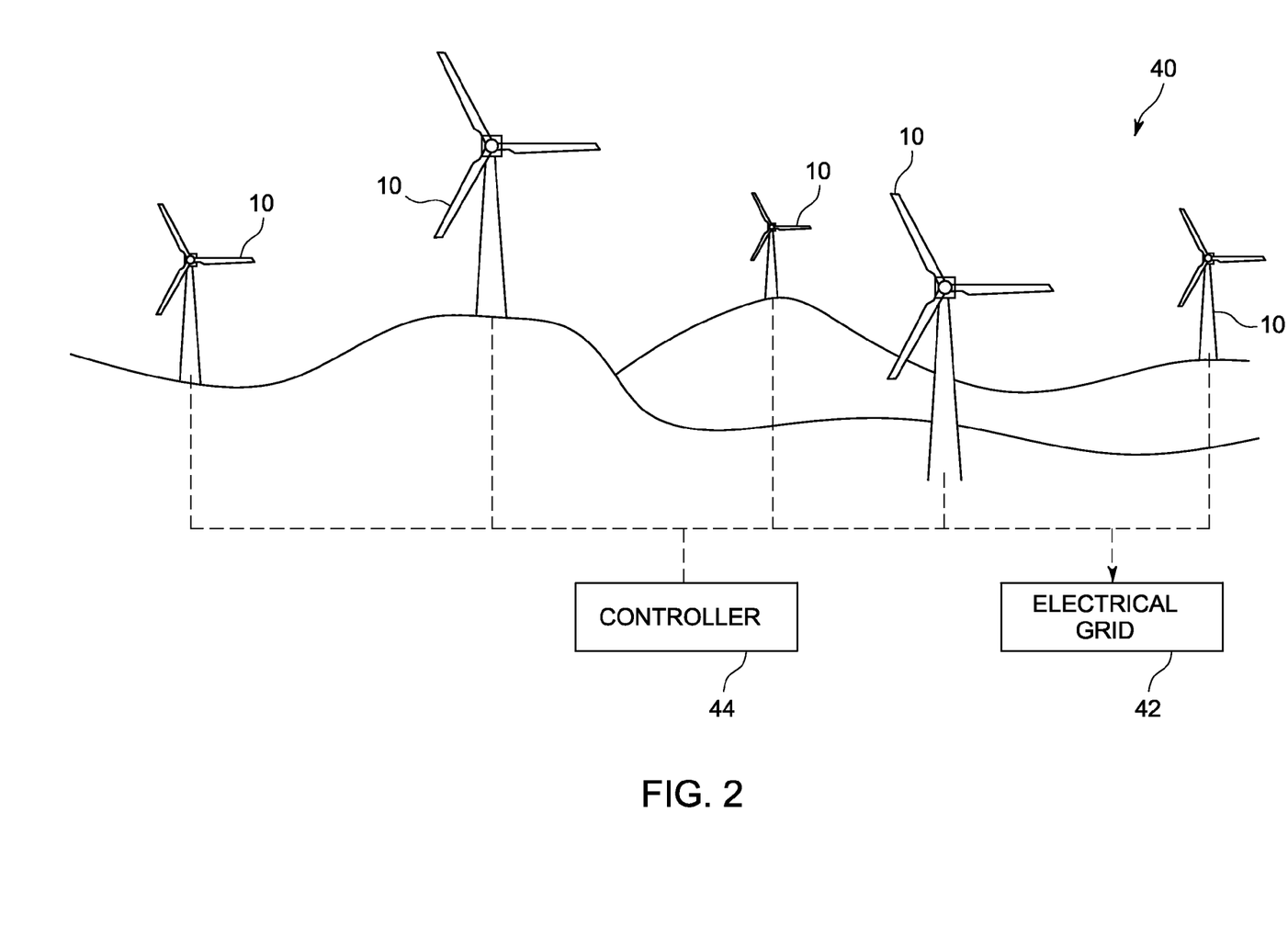
FIG. 2 is a schematic diagram of multiple wind turbine systems, as shown in FIG. 1, provided as part of a wind power plant, in accordance with aspects of the present disclosure.

With the foregoing discussion of a wind turbine system 10 in mind, FIG. 2 is a schematic diagram of a multitude of such wind turbine systems 10 disposed to function together as part of a wind power plant 40. Electrical currents produced by the wind turbine systems 10 of the wind power plant 40 are provided to an electrical power grid 42, thereby providing electrical energy to consumers connected to the grid 42. Further one or more controllers 44 may be provided to control and/or monitor operation of the wind power plant 40. Such controllers 44 may be provided as general or special purpose computers (or other suitable processor-based systems) configured to execute code or routines that allow monitoring and/or control of the wind power plant 40 as a whole and/or of individual wind turbine systems 10 of the plant 40.

Figure 3:
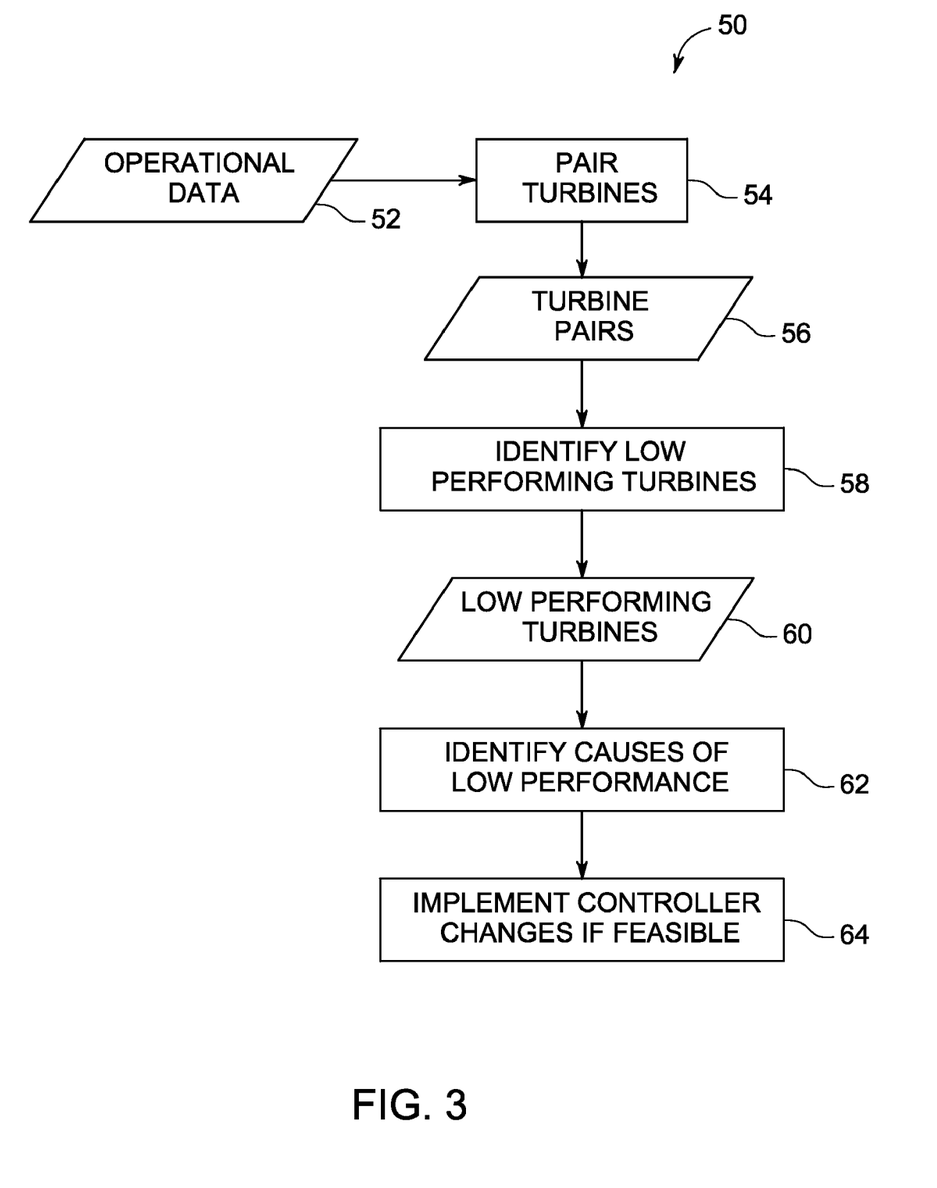
FIG. 3 is a flowchart depicting steps of an algorithm which, when implemented, identifies low performing turbines in accordance with aspects of the present disclosure.

For example, in one embodiment, a controller 44 (or other processor based system) may execute control logic such as that exemplified by the flowchart of FIG. 3 depicting steps of a method 50 that may be used to identify lower performing wind turbine systems 10 and/or to implement changes to improve the performance of such low performance systems. As depicted by the flowchart, operational data 52 for some or all of the turbine systems 10 of a wind power plant 40 is provided for processing in accordance with the method 50. Examples of suitable operational data include, but are not limited to, wind speed data over time for each turbine system 10, power output over time for each turbine system 10, operational state of each turbine system 10 over time, and so forth.

In the depicted example, the various wind turbine systems 10 are paired together for analysis such that those turbine systems 10 that are expected to experience the most similar power generating conditions (such as based on location, terrain, measured wind speeds, and so forth) are compared to one another. For example, in one implementation, the wind turbine systems 10 of a wind power plant 40 may be paired (block 54) based on geographic proximity or distance, based on the similarity of the proximate terrain, based on the similarity of wind speed experienced by the turbines, based on the similarity of turbine model and/or control system, and so forth, for a pairwise comparison process. In the depicted example, the turbine pairs 56 (e.g., a turbine pair consisting of turbines i and j) are compared based on the corresponding operational data 52 to identify (block 58) those turbine systems that have unexpectedly lower performance (e.g., producing less electricity than expected based on the observed air flow). Operational data for these lower performing turbines 60 may be analyzed to identify (block 62) the cause or causes of their unexpectedly low performance. In one implementation, root cause analysis or a similar approach may be performed to identify the various sources of low performance. A report may be generated listing or ranking the lower performing turbines 60 and/or the cause or causes leading to low performance among the identified turbines. To the extent that modifications may be implemented (block 64) by a controller 44 to address the causes of poor turbine performance, such changes may be implemented automatically, semi-automatically (i.e., with user input or oversight), or manually.

Figure 4:
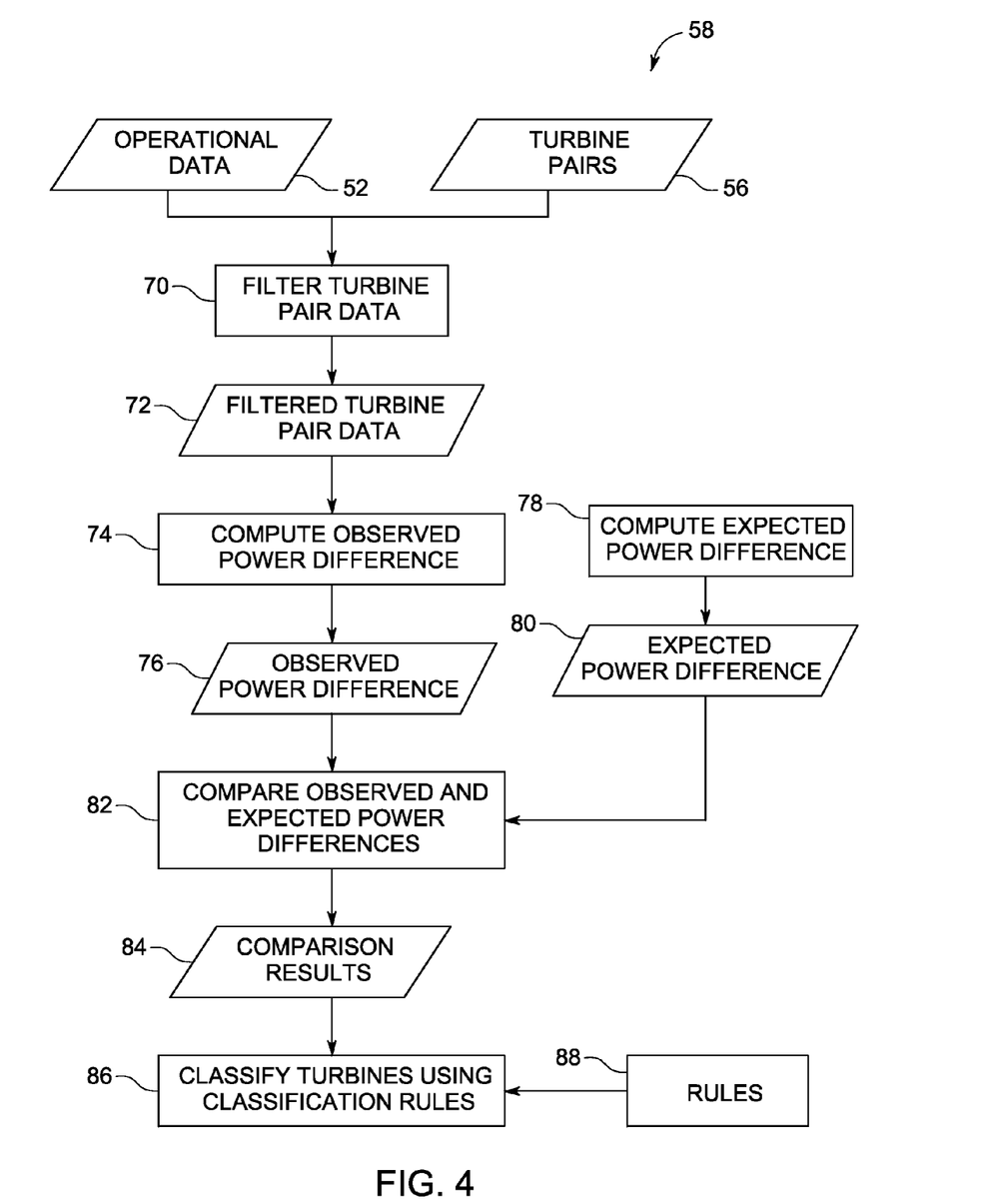
FIG. 4 is a flowchart depicting steps of an algorithm which, when implemented compares observed and expected performance to allow comparison of turbines in accordance with aspects of the present disclosure.

With respect to the step 58 of identifying low or poor performing turbines, FIG. 4 depicts one example of control logic that may be performed in this identification process. In this example, turbine operational data 52 for the turbine pairs 56 is filtered (block 70) to generate a set of filtered turbine pair data 72. In one implementation, the operational data 52 for the turbine pairs 56 are concurrent records (i.e., records for the turbine pair 56 acquired at the same date and time (e.g., having the same timestamp) of operating conditions (e.g., wind speed) and/or operating performance (e.g., power output).

Figure 5:
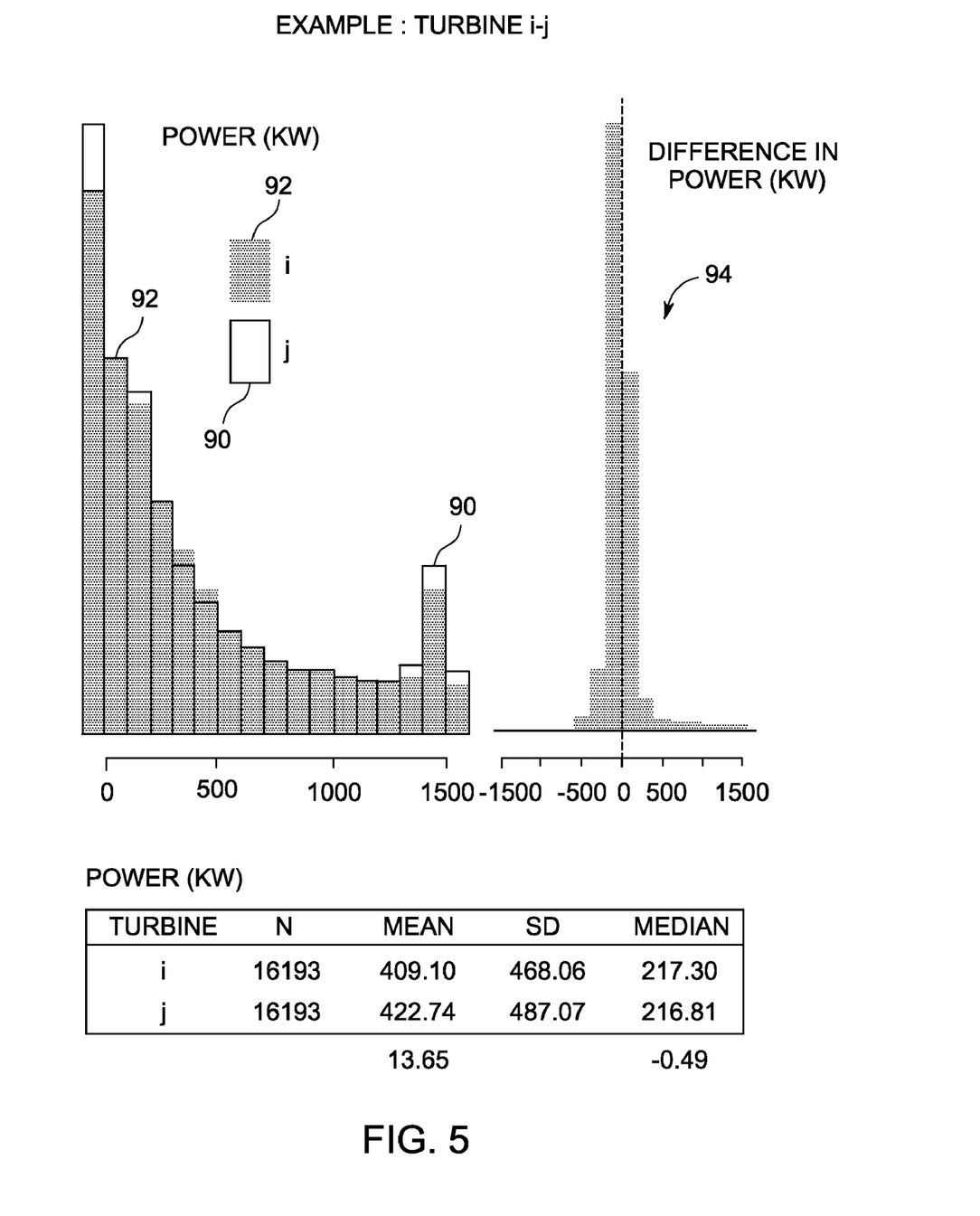
FIG. 5 depicts plots of concurrently acquired operational data for a pair of turbines and a corresponding difference plot in accordance with aspects of the present disclosure.

An example of a concurrent set of power output data obtained for two paired wind turbines (i.e., turbines i and j) is depicted in FIG. 5. In this example, the respective concurrent measurements for each turbine are plotted as histograms 90, 92 with frequency of measurements depicted along the y-axis and power output in kW depicted along the x-axis. In the depiction of FIG. 5, the respective histograms 90, 92 overly one another to facilitate visual comparison. In addition, a plot 94 of the differences in power production (measured in kW) for the two turbines (computed for the observed power output of turbine i minus the observed output of turbine j) is also provided to visually depict the observed differences in power output at the two turbines based on concurrently measured data points. Measures of central tendency (here the mean and median values) for each distribution 90, 92 are also provided along with a measure of the variation (here the standard deviation) associated with the distribution. Differences between the respective means and medians are also depicted.

The filtering of the operational data 52 for a turbine pair 56 may be based on a variety of criteria. For example, one filtering criteria may discard data for which either or both of the wind turbine systems 10 of the pair were not running or operational. In addition, readings related to certain portions of the power curve (e.g., the flat parts of the power curve) where the wind turbine systems 10 are generating little or no power or where the wind turbine systems 10 are operating at full or rated power (e.g., power outputs greater than 1500 kW for a 1.5 MW rated turbine) may be discarded from the operational data 52 for a turbine pair 56. For example, above a certain wind speed for each wind turbine system 10, the rotational speed of the blades 16 (and connected rotational components) of the wind turbine system 10 may reach a substantially constant speed such that faster wind speeds do not result in faster rotation of the blades 16. In certain embodiments, operational data corresponding to this flat portion of the power output curve may be discarded. In such an embodiment, the retained operational data reflects those portions of the power output curve where increases in wind speed result in increased power output. By way of example with respect to the above criteria, operational data may be discarded in one embodiment when the power output less than 100 kW and/or more than 1,400 kW. Likewise, in such an implementation operational data may be discarded when the observed wind speed is less than 4 miles per hour or greater than 20 mph.

Likewise, in certain implementations, data in which both wind turbine systems 10 are not "wake-free" (i.e., not in the wake of another wind turbine system 10) may be discarded because the turbines of the pair are not experiencing substantially similar wind conditions. For example, in one embodiment, a common wake-free sector is determined for the turbine pair. In one such example, a meteorological mast (i.e., a metmast) or the turbine data itself may be used to monitor or infer wind direction. The wind direction data obtained from the meteorological mast may be merged with the turbine operational data, such as based upon a date-time stamp, and used to filter out those data points where, based on the measured wind direction, one or both turbines are determined to be within a wake (i.e., not wake-free). Thus, the filtered turbine pair data 72 may be generated using some or all of these filtering criteria.

The filtered turbine pair data 72 may be used to compute (block 74) the observed power difference 76 (e.g., the mean, median, or mode of the observed power difference) between the turbines of each turbine pair. For example, for turbine pair i, j, mean measured power output may be represented, respectively, as $p_i$ and $p_j$. Such power measurements may correspond to wind velocities $v_i$ and $v_j$ measured at the respective turbines i and j during power generation. Thus the observed power difference, d, at the two turbines may be represented as:

$$d_{ij} = p_j - p_i. \quad (1)$$

at any point in time, i.e., at concurrent times. These difference values may be averaged (or a median, mode, or other measure of central tendency derived) to generate a value indicative of the difference 76 in the observed power for the different turbines i and j of a turbine pair.

Figure 6:
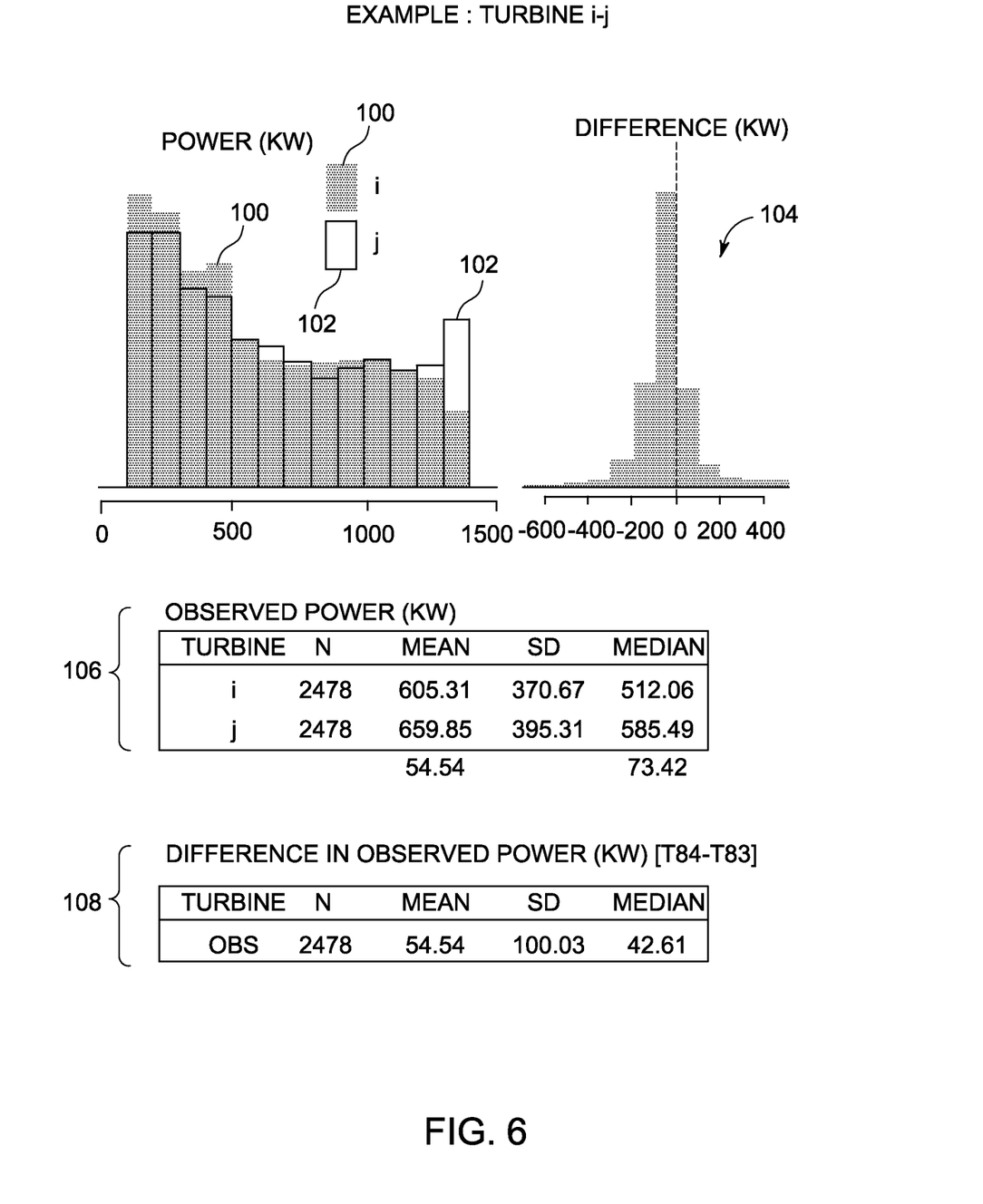
FIG. 6 depicts plots of observed power output for a pair of turbines and a corresponding difference plot in accordance with aspects of the present disclosure.

By way of example, FIG. 6 depicts observed power differences for a set of filtered data, as discussed herein. In this example, the filtered power output data obtained for two paired wind turbines (i.e., turbines i and j) is depicted. The respective filtered measurements for each turbine are plotted as histograms 100, 102 with frequency of measurements depicted along the y-axis and power output in kW depicted along the x-axis. In the depiction of FIG. 6, the respective histograms 100, 102 overly one another to facilitate visual comparison. In addition, a plot 104 of the differences in power production (measured in kW) for the two turbines (computed for the observed power output of turbine i minus the observed output of turbine j) is also provided to visually depict the observed differences in power output at the two turbines based on the filtered data points. Measures of central tendency (here the mean and median values) for each distribution 100, 102 are also provided along with a measure of the variation (here the standard deviation) (block 106) associated with the distribution. The mean, median, and variation measures may be used individually or collectively to perform comparison between the respective distributions. In addition, mean, median, and/or standard deviation values (block 108) may also be determined for the distribution of the differences (plot 104) between the concurrent observed power measurements for turbines i and j. In one embodiment, the difference in the observed power for turbines i and j may be computed as the mean power output of turbine j minus the mean power output of turbine i.

An observed power difference 76 may be compared (block 82) with a corresponding expected power difference 80 (i.e., the differences between the expected power values) for the respective turbine pairs. In one embodiment, the expected power difference, $\hat{d}$, for a turbine pair may be based (block 78) on reference power curve models for the respective turbines. Such reference power curve models may be used in conjunction with the measured wind velocities $v_i$ and $v_j$ to estimate or simulate the expected wind turbine performance of each of turbines i and j. Such reference power curve models may be based on the official or known power curve for the turbine model and/or may be based on the known or assumed physical principles applicable to the respective turbines. Alternatively, in one implementation, the power curve used as a reference for the expected power distribution may be based on the observed data from some or all of the turbines of the facility, rather than assuming a theoretical power curve. That is, the power curve serving as the reference may be derived or based on the performance of a representative population of wind turbines, at the same respective facility or at another location.

By way of example, for turbine i and turbine j, the respective wind speeds $v_i$ and $v_j$ may have been observed at the turbines at the filtered observation times. The observed wind speeds, $v_i$ and $v_j$, may be used in conjunctions with the respective reference power curve models for each turbine to simulate performance of the turbines i and j and to thereby derive a predicted power output, $\hat{p}_i$ and $\hat{p}_j$, for each respective turbine for the time intervals corresponding to the measured wind velocities observed at the respective turbines. Thus, in this example, the difference 80 in the respective expected power outputs at a given time may be represented as:

$$\hat{d}_{ij} = \hat{p}_j - \hat{p}_i. \quad (2)$$

Figure 7:
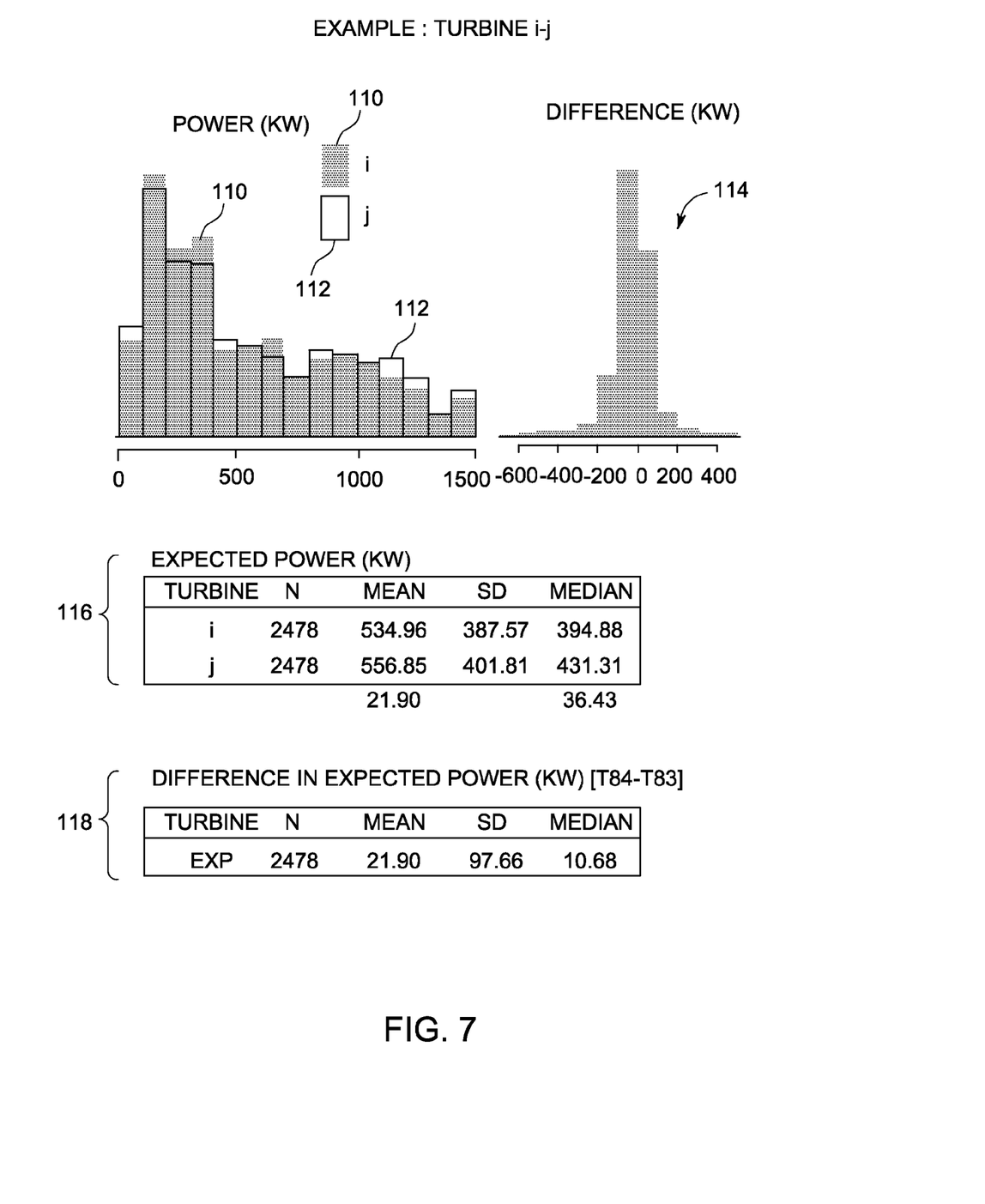
FIG. 7 depicts plots of expected power output for a pair of turbines and a corresponding difference plot in accordance with aspects of the present disclosure.

By way of example, FIG. 7 depicts expected power differences for turbine i and j, as discussed herein. In this example, the expected power output data (based on measured wind velocities) for two paired wind turbines (i.e., turbines i and j) is depicted. The respective expected power output data for each turbine is plotted as histograms 110, 112 with projected frequency of measurements depicted along the y-axis and expected power output in kW depicted along the x-axis. In the depiction of FIG. 7, the respective histograms 110, 112 overly one another to facilitate visual comparison. In addition, a plot 114 of the differences in expected power production (measured in kW) for the two turbines (computed for the expected power output of turbine i minus the expected output of turbine j) is also provided to visually depict the expected differences in power output at the two turbines based on the measured wind speeds. Measures of central tendency (here the mean and median values) for each distribution 110, 112 are also provided along with a measure of the variation (here the standard deviation) (block 116) associated with the distribution. The mean, median, and variation measures may be used individually or collectively to perform comparison between the respective distributions. In addition, mean, median, and/or standard deviation values (block 118) may also be determined for the distribution of the differences (plot 114) between the expected power measurements for turbines i and j. In one embodiment, the difference in the expected power for turbines i and j may be computed as the mean expected power output of turbine j minus the mean expected power output of turbine i.

As discussed above, in certain implementations, probability distributions of the differences expected and/or observed power output between the turbines of a turbine pair 56 may be estimated, such as via respective histograms of the observed and/or expected power differences 76. In such implementations a probability distribution of difference in power outputs between two turbines exists for both the actual distribution based on observed power measurements as well as for the predicted distribution based on simulation and the observed wind speeds at each respective turbine. These two distributions can be compared (block 82) to determine their equivalence using suitable statistical or mathematical measures, as discussed below.

Figure 8:
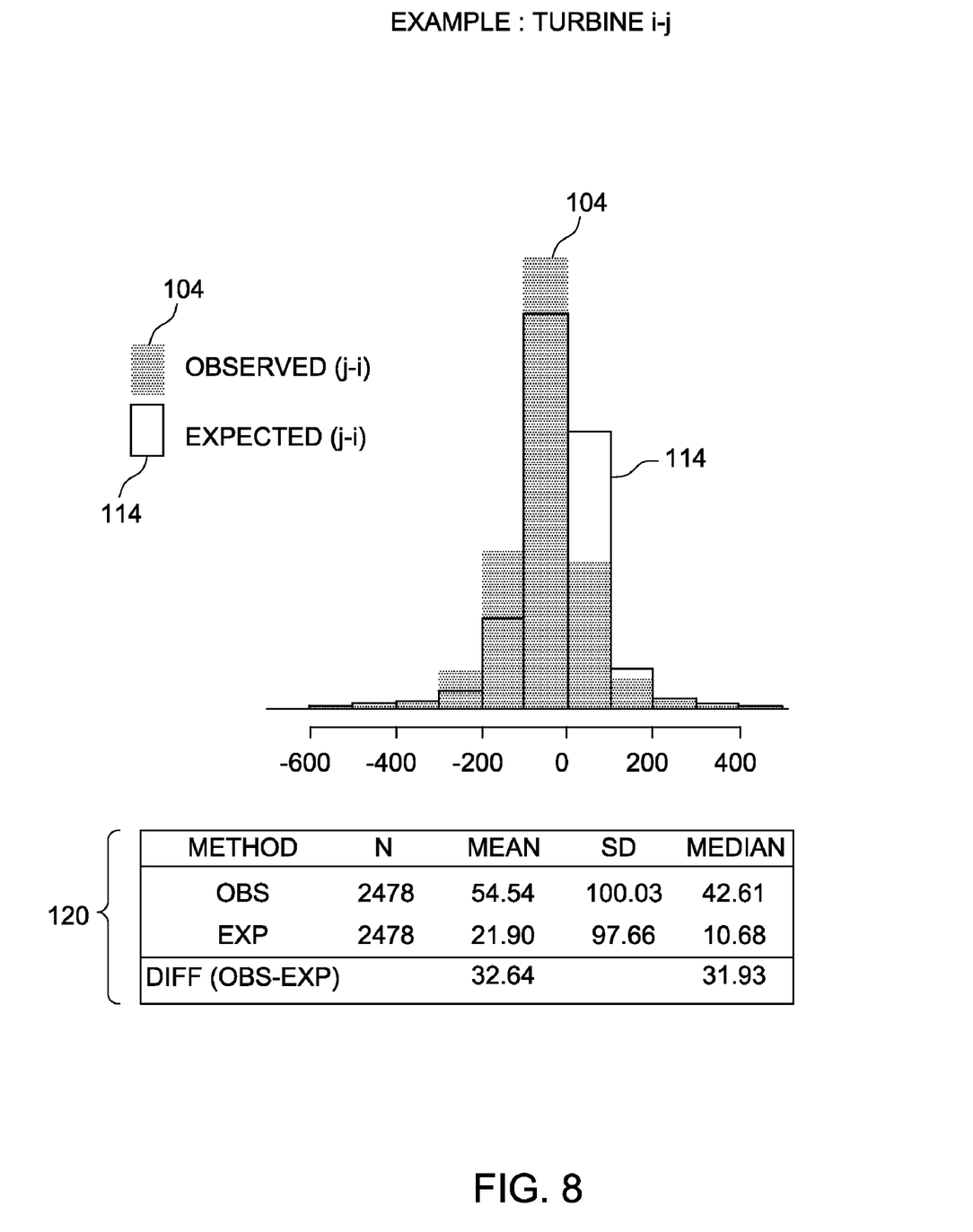
FIG. 8 depicts plots of the observed and expected power output differences for a pair of turbines in accordance with aspects of the present disclosure.

For example, turning to FIG. 8, plot 104 of the differences in actual (i.e., observed) power production and the plot 114 of the differences in expected power production for the two turbines are compared. In FIG. 8, the respective plots are shown overlaying one another to facilitate visualizing the differences in the plots. In addition, measures of central tendency (here the mean and median values) for each distribution 104, 114 are also provided along with a measure of the variation (here the standard deviation) (block 120) associated with the distribution. The mean, median, and variation measures may be used individually or collectively to perform comparison between the respective distributions, such as based upon the calculated differences between the observed and expected values for one or more of these measures. For example, in one embodiment the mean of the differences in observed power (e.g., 54.54 in the depicted example) minus the mean of the differences in expected power (e.g., 21.90 in the depicted example) may be calculated as one metric in comparing the respective distributions.

In general, based on the results 84 of the comparison process 82, turbines may be identified that appear to be below expected performance based on the observed wind conditions and the performance of the most similar turbine in proximity, geography, and/or observed wind speeds. For example, in one embodiment, the comparison results 84 may be presented as one or more measures or scores (e.g., severity scores) that may be used to rank the wind turbine pairs of the wind power plant based on the differences between the observed power differences 76 and the expected power differences 80 of the respective turbine pairs. For example, a severity score based on a t-statistic like measure may be calculated for each wind turbine pair and used to rank the pairs. In one such embodiment, may be based on a mean (or median) power difference for each pair of wind turbines as well as a standard deviation (or interquartile range) associated with the respective power difference distribution.

The wind turbine pairs having the greatest differences between the observed power differences 76 and the expected power differences 80 may include a turbine that is a likely candidate for possible control improvements or which has existing mechanical or structural defects that can be addressed. Within the turbine pair so identified, the turbine which has the lower mean for observed power output constitutes the underperforming or low performing turbine to be corrected.

By way of example, in one embodiment a score, S, for turbines i and j may be given by the equation:

$$S_{ij} = g \cdot |\text{mean}(d_{ij}) - \text{mean}(\hat{d}_{ij})| \quad (3)$$

where g determines the sign of the score. In one such implementation, g may be given by:

$$g = \begin{cases} +1, & \text{if } |\text{mean}(d_{ij})| > |\text{mean}(\hat{d}_{ij})| \\ -1, & \text{Otherwise.} \end{cases} \quad (4)$$

In such an implementation, a negative score (i.e., g=−1) may be indicative of anemometry errors. Conversely, in such an implementation, a positive score (i.e., g=1) may be indicative of performance issues associated with a turbine of the wind turbine pair i and j. The magnitude of the score, S, is indicative of the extent of the performance issue, i.e., a higher score indicates a bigger performance issue.

As will be appreciated, identification of anemometry errors in accordance with the above approach is based on the assumption that neighboring or paired turbines typically should have close to zero performance difference (after observations subject to wake effects and/or turbine unavailability are removed from consideration). If the observed power difference is less than the expected power difference, the observed power difference is determined to be correct and the expected power difference is assumed to be corrupted by anemometer error. That is, since the expected power difference is determined using the wind speeds measured at the turbines and the respective reference power curves, it can be concluded that the wind speed measurements are likely at fault (i.e., anemometry error). Conversely, if the expected power difference is less than the observed power difference, the expected power difference can be believed. As a result, the observed power difference is assumed to be more reliable than the nacelle anemometer readings and it can be concluded that the performance difference between the two turbines may be real.

In other embodiments, the results 84 of the comparison process 82 may be presented as a statistical analysis, such as respective confidence bands or intervals reflecting the likelihood that the observed power difference for a wind turbine pair is consistent with normal operation of the respective wind turbine pair given the expected power differences. Observed power differences near or outside the boundaries of the respective confidence bands or intervals may indicate likely candidates within a turbine pair to evaluate for possible control improvements or for existing defects. Likewise, other types or forms or statistical analysis or presentation may be employed to identify those turbines pairs where observed and expected power differences are not within acceptable bounds or limits. For instance, one could use re-sampling methods to test the null hypothesis that the means of the two distributions are equal. Further, the Kolmogorov-Smirnov test can be used to test whether the observed and expected differences are drawn from the same distribution. Based on such comparison approaches, the identified aberrant pairs will typically include a wind turbine that may be suitable for control improvements or for inspection for defects.

In one embodiment, a rule-based approach may be employed to evaluate the comparison results and to automatically classify (block 86) those turbine pairs where an opportunity exists to address a performance issue. Such a rule-based approach may employ a set of rules 88 that, when applied to the comparison results 84, allow turbine pairs to be classified as being within expected tolerances or as not being within the expected tolerances. Further, the rules 88 may allow further classification of those turbine pairs that are not within the expected tolerances into different categories based on their scores. In one embodiment, comparison results 84 that are not within the expected tolerances for a turbine pair may be categorized as relating to anemometry (e.g., erroneous measurements of wind speed and/or direction) or to control issues or mechanical defects associated with the turbines in question.

Turning to FIG. 9, an example of a set of results derived in accordance with the present approach is depicted. In this example, turbines are paired (i.e., turbine pairs 56) for comparison of their operational data. For the filtered operational data, the observed wind speed difference 130 (e.g., the mean or median of the distribution of wind velocities for the filtered operational data) is determined. Likewise, the difference in observed or actual power output 76 (e.g., (e.g., the mean or median of the distribution of power output for the filtered operational data) is determined. Based upon the wind speed differences, the expected power difference 80 (e.g., the mean or median of the distribution of expected power output, as estimated based on the known wind speed and the reference power curves for each turbine) is determined. Based on the Equations 3 and 4 discussed herein (or another suitable algorithm), a score 132 may be determined for each turbine pair 56. In the depicted example, the score 132 is provided as a t-statistic, i.e. mean difference normalized by standard deviation. In one embodiment, based on a rule-based analysis, scores with a negative value (set 134) may be determined to be indicative of anemometry error. Of the remaining scores, some subset 136 may be determined to represent an opportunity for improvement in that one of the pair of turbines may have a mechanical or control issue that can be addressed. The subset 136 may be determined in a variety of ways, including using a threshold score value (e.g., scores above 5, 7, 10, and so forth) or selecting some number, n, of the highest scores for improvement. Within the subset of opportunity turbines, the turbine with the lower mean observed power output is typically identified as the turbine needing improvement within a given turbine pair 56.

Technical effects of the invention include using routines or algorithms suitable for implementation using a processor-based system to identify turbines of a power plant, such as a wind power plant, that are underperforming based on observed conditions and modeled expectations of expected performance. Performance of the identified turbines, and of the power plant as a whole, may be improved by addressing the underperforming turbines, such as by implementing mechanical or structural corrections or by implementing changes to a control scheme implemented on one or more controllers associated with the underperforming turbine(s). A rules-based analysis may be implemented to identify those turbines where correction or improvement is appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for assessing wind turbine performance, the method comprising:
   pairing turbines of a plurality of wind turbines to generate one or more pairs of turbines;
   acquiring a set of concurrently acquired operational data for each pair of turbines;
   filtering the set of concurrently acquired operational data of each pair of turbines to generate a respective set of filtered data for each pair of turbines; and
   identifying low-performing turbines within some or all of the respective pairs of turbines based on the respective sets of filtered data.

2. The method of claim 1 wherein the plurality of wind turbines constitute some or all of the wind turbines of a wind power plant.

3. The method of claim 1 wherein wind turbines are paired based upon one or more of proximity, similarity of terrain, similarity of turbine model and/or control system, or similarity of wind speeds.

4. The method of claim 1 wherein identifying low-performing turbines comprises statistically evaluating whether the observed power difference for a respective pair of turbines is inconsistent with normal operation of the respective pair of turbines in view of the expected power difference.

5. The method of claim 1 wherein the operational data comprises one or both of a record of power output for each respective turbine at respective dates and times or a record of measured wind velocity at the respective dates and times.

6. The method of claim 1 wherein filtering the set of concurrently acquired operational data of each pair of turbines comprises one or more of discarding data acquired when one or both turbines of a respective pair of turbines are not operating, discarding data where little or no power was generated by one or both turbines of the respective pair of turbines, discarding data where one or both turbines of the respective pair of turbines were operating at full or rated power, discarding data where one or both turbines of the respective pair of turbines are in a waked condition.

7. The method of claim 1 wherein identifying the low-performing turbines comprises:
   computing observed power differences for each pair of turbines;
   computing expected power differences for each pair of turbines;
   for each pair of turbines, comparing the observed power differences and the expected power differences; and
   classifying each pair of turbines based on the comparison.

8. The method of claim 7 wherein classifying each pair of turbines comprises generating a score for each pair of turbines, wherein the sign of the score indicates possible anemometry errors and the magnitude of the score indicates the magnitude of difference between the observed power differences and the expected power differences for each pair of turbines.

9. The method of claim 7 wherein the observed power differences and the expected power differences are based on mean or median values and standard deviations or interquartile ranges for respective distributions of observed power differences and expected power differences.

10. The method of claim 1 wherein identifying the low-performing turbines comprises applying one or more-rulebased analyses that distinguish low-performing turbines from one or more turbines demonstrating possible anemometry errors.

11. The method of claim 1 wherein the low performing turbine of a pair of turbines is identified as being the turbine having the lower mean or median power output.

12. A processor-based controller configured to control operation of one or more pairs of wind turbines, the processor-based controller configured to execute one or more routines which, when executed, perform acts comprising:
    computing an observed power difference for each pair of turbines;
    computing an expected power difference for each pair of turbines; and
    identifying a low-performing turbine, if present, within each pair of turbines based on a measure derived based at least on the observed power difference and the expected power difference for the respective pair of turbines.

13. The processor-based controller of claim 12, further configured to execute one or more routines which, when executed, alters the manner in which one or more of the low-performing turbines is controlled.

14. The processor-based controller of claim 12 wherein the observed power difference for each turbine pair is computed based on a filtered set of data comprising concurrently acquired operational data for each turbine of a respective pair of turbines.

15. The processor-based controller of claim 12 wherein the low-performing turbines are identified based on a respective score generated for each turbine pair based on the observed power difference and expected power difference for the respective pair of turbines.

16. A non-transitory computer-readable media comprising routines which, when executed on a processor, perform the following:
    filtering a set of operational data for a pair of wind turbines to generate a filtered set of data;
    computing a measure of observed power difference for the pair of wind turbines;
    computing a measure of expected power difference for the pair of wind turbines; and
    comparing the measure of observed power difference and the measure of expected power difference for the pair or wind turbines.

17. The non-transitory computer-readable media of claim 16, comprising routines which, when executed on a processor, identify a low-performing turbine in the pair of wind turbines based on the comparison.

18. The non-transitory computer-readable media of claim 17 wherein identifying the low-performing turbine comprises applying one or more-rule-based analyses that distinguish low-performing turbines from one or more turbines demonstrating possible anemometry errors.

19. The non-transitory computer-readable media of claim 16, comprising routines which, when executed on a processor, generate a score for the pair of wind turbines, wherein the score is indicative of the presence of a low-performing turbine in the pair of wind turbines.

20. The non-transitory computer-readable media of claim 16 wherein the measure of observed power difference and the measure of expected power difference are based on a mean or a median and standard deviation or interquartile range.

* * * * *